(12) United States Patent
Goldenberg

(10) Patent No.: US 11,149,836 B2
(45) Date of Patent: Oct. 19, 2021

(54) SHEAVE

(71) Applicant: Nicolás Alejandro Goldenberg, Valencia (ES)

(72) Inventor: Nicolás Alejandro Goldenberg, Valencia (ES)

( * ) Notice: Subject to any disclaimer, the term of this patent is extended or adjusted under 35 U.S.C. 154(b) by 0 days.

(21) Appl. No.: 16/471,775

(22) PCT Filed: Dec. 21, 2017

(86) PCT No.: PCT/ES2017/070841
§ 371 (c)(1),
(2) Date: Jun. 20, 2019

(87) PCT Pub. No.: WO2018/115564
PCT Pub. Date: Jun. 28, 2018

(65) Prior Publication Data
US 2020/0088288 A1    Mar. 19, 2020

(30) Foreign Application Priority Data
Dec. 23, 2016 (ES) .................. 201631524U

(51) Int. Cl.
*F16H 55/50* (2006.01)
*B66D 3/04* (2006.01)

(52) U.S. Cl.
CPC ............. *F16H 55/50* (2013.01); *B66D 3/04* (2013.01)

(58) Field of Classification Search
CPC .. B66D 3/04; B66D 3/08; F16H 55/50; B66B 15/04
See application file for complete search history.

(56) References Cited

U.S. PATENT DOCUMENTS

| 1,980,123 | A | * | 11/1934 | Weber | ...................... B66D 3/04 384/474 |
| 4,390,163 | A | * | 6/1983 | Merry | ...................... B66D 3/04 254/412 |
| 2005/0263748 | A1 | * | 12/2005 | Smith | ...................... B66D 3/04 254/409 |
| 2019/0062131 | A1 | * | 2/2019 | Tamme | .................... B63H 9/10 |

FOREIGN PATENT DOCUMENTS

| AU | 2004202511 A1 | 7/2004 | |
| DE | 3626045 A1 * | 2/1988 | ............. B66B 15/04 |
| NL | 1036380 C2 | 7/2010 | |
| WO | 2018015605 A1 | 1/2018 | |
| WO | WO-2018115564 A1 * | 6/2018 | ............... B66D 3/04 |

OTHER PUBLICATIONS

International Search Report and Written Opinion in corresponding International Patent Application No. PCT/ES2017/070841 dated May 7, 2018. 14 pages.
International Preliminary Report on Patentability in corresponding International Patent Application No. PCT/ES20171070841 dated Mar. 22, 2019. 14 pages.

* cited by examiner

*Primary Examiner* — Michael E Gallion
(74) *Attorney, Agent, or Firm* — Intellectual Property Law Group LLP

(57) ABSTRACT

A pulley comprising a wheel or sheave (1) having a central recess (2) and a channel (3); and at least one fastening cable (4) designed for transmitting the force from the sheave (1) to a fastening point, the cable passing transversely to the sheave (1) through the central recess (2); and which incorporates at least one low-friction bushing (6) that is housed between the fastening cable (4) and the sheave (1).

6 Claims, 14 Drawing Sheets

SHEAVE

CROSS-REFERENCE TO RELATED PATENT APPLICATIONS

This is a U.S. National Phase Application under 35 U.S.C. § 371 of International Patent Application No. PCT/ES2017/070841, filed Dec. 21, 2017, and claims priority to Spanish Patent Application No. ES U201631524 filed Dec. 23, 2016, which is incorporated by reference in its entirety. The International Application was published on Jun. 28, 2018, as International Publication No. WO 2018/115564 A1.

The object of the present utility model is a pulley for the diversion and/or multiplication of forces of low weight and high resistance, through the use of at least one cable, and whose main differentiating feature is that it uses a low-friction bushing housed between the cable and the sheave of the pulley itself.

BACKGROUND OF THE INVENTION

At present, a great diversity of pulleys, methods of reduction ratio of forces and/or elements for the diversion of cables are known in the state of the art.

An example of these is the low-friction sheaves, which are essentially formed by a wheel with a groove or "channel" on its outer edge, and a central recess. These pieces are fixed on their outer surface by means of a cable, using their central recess (which has a geometry that reduces friction) for the diversion of the cable.

This type of pieces does not allow the rotation of the wheel, since it uses its outer surface with low coefficient of friction, to allow the cable to slide over its surface.

The advantages of these pieces are, among others that they allow a high work load and have a low weight and a high durability, while their main drawback is that the absence of rotation generates a wear on the cables that are in direct contact with the wheel, and are therefore generally used in almost static forces.

Another example would be the pulleys with roller or ball bearings (with balls, rollers or a single bearing), where the wheels contained in these pulleys have internal bearings which consist of two concentric cylinders between which are housed a set of rollers or balls that can rotate freely. The external cylinder comprises the "channel" for the diversion of the cable and the central recess is connected to the body to contain the ball bearing and, thus, provide structure and fastening means.

This type of pulleys has a very low coefficient of friction, but a lower resistance, and its manufacturing cost is higher due to the large number of components it incorporates. Consequently, its useful life is shorter compared to other solutions since it must depend on the bearings for pcabler operation and on the body as a structural element.

Finally, pulleys, such as the one described in WO2015001028, are known, that is, a pulley that allows a cable to be diverted through an annular groove of the pulley, and that, in turn, through the use of a wheel without bearings and a separator, allows the wheel to turn.

These pulleys allow a high work load and have low weight and high durability. However, their fastening cable acts both as an axis and as a main structure so that it is in direct contact with the element of rotation, which generates high friction and wear of the aforementioned cable, which compromises its structural integrity, requiring a periodic replacement of the fastening cable. In addition, the cable used will need to have a low level of friction, which reduces the range of cables to be used, increasing the cost of the assembly.

DESCRIPTION OF THE INVENTION

The technical problem that the present invention resolves consists in offering a pulley that has a low weight, a high work load, a great durability, efficiency and safety. To that end, the pulley, subject matter of the present utility model, is characterized in that it comprises a wheel or sheave that incorporates a central recess and a channel, and is characterized in that it incorporates at least one fastening cable configured to transmit the effort from the sheave to a fastening point transversely to the sheave, through the central recess; and because it incorporates at least one low-friction bushing.

Thanks to its design, the pulley disclosed here will have a high performance and will be economically inexpensive, which increases its profitability both at the time of purchase and when in use, increasing, in turn, its safety in comparison with the pulleys existing in the state of the art.

The fact that the number of pieces, and therefore the structure of the pulley, has been simplified compared to other pulleys existing in the state of the art, allows the present invention to be presented as a modern and highly secure solution.

The incorporation of sacrificed pieces (bushing), which are easily replaceable, allows to increase the useful life of the assembly of the pulley, reducing its maintenance costs, since it will only be necessary to change those sacrificed pieces for new ones, a fact that will not require a high specialization, which will further reduce maintenance costs and/or amortization of the purchase of the pulley presented herein.

Thus, the end user will be able to stretch the useful life of the pulley, without reducing the work capacity or the level of safety required for said pieces.

In the event that the sacrificed piece exhausts its useful life, the structural integrity of the pulley will not be endangered, since it can continue to be used until the replacement of said sacrificed piece.

Throughout the specification and the claims, the word "comprises" and its variants do not intend to exclude other technical characteristics, additives, components or steps. For the persons skilled in the art, other subject matters, advantages and characteristics of the invention will emerge partly from the specification and partly from the implementation of the invention. The following examples and drawings are provided by way of illustration, and are not intended to restrict the present invention. In addition, the present invention covers all possible combinations of particular and preferred embodiments indicated herein.

BRIEF DESCRIPTION OF THE FIGURES

A series of drawings that help to better understand the invention and that are expressly related to an embodiment of said invention that is presented as a non-limiting example thereof, is briefly described below.

PREFERRED EMBODIMENT OF THE INVENTION

Figure 1:
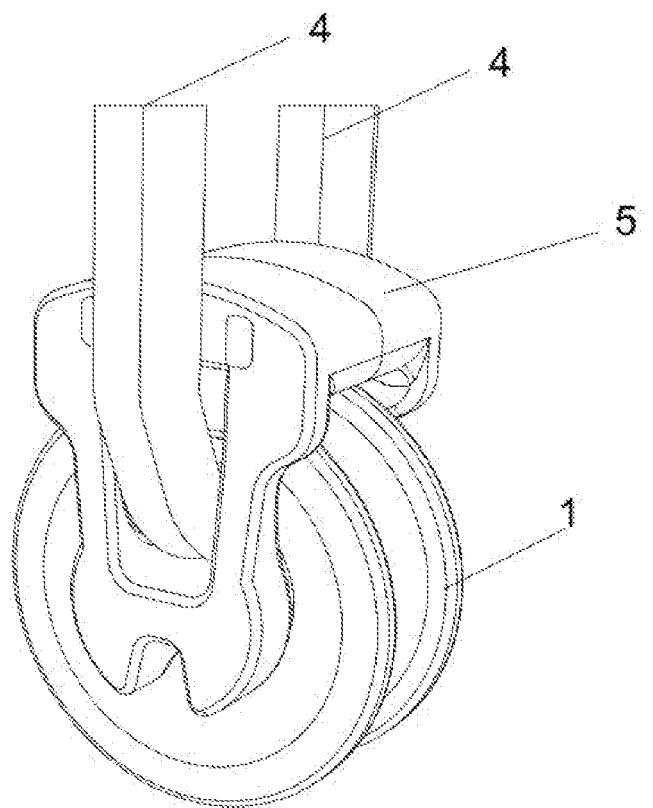
FIG. 1. Shows a first practical embodiment of the pulley subject matter of the present utility model.
Figure 2:
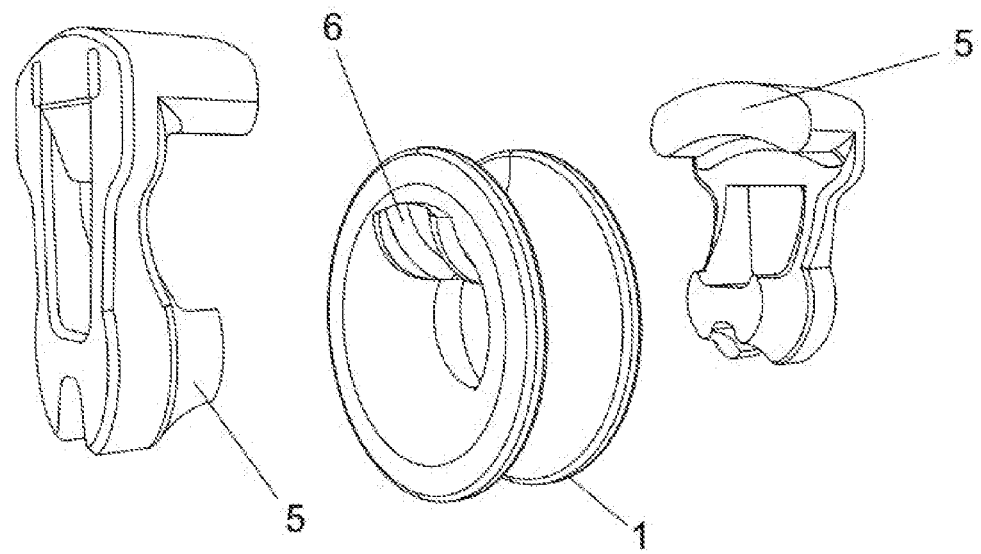
FIG. 2. Shows an exploded view of the components that make up the pulley shown in the previous figure.
Figure 3:
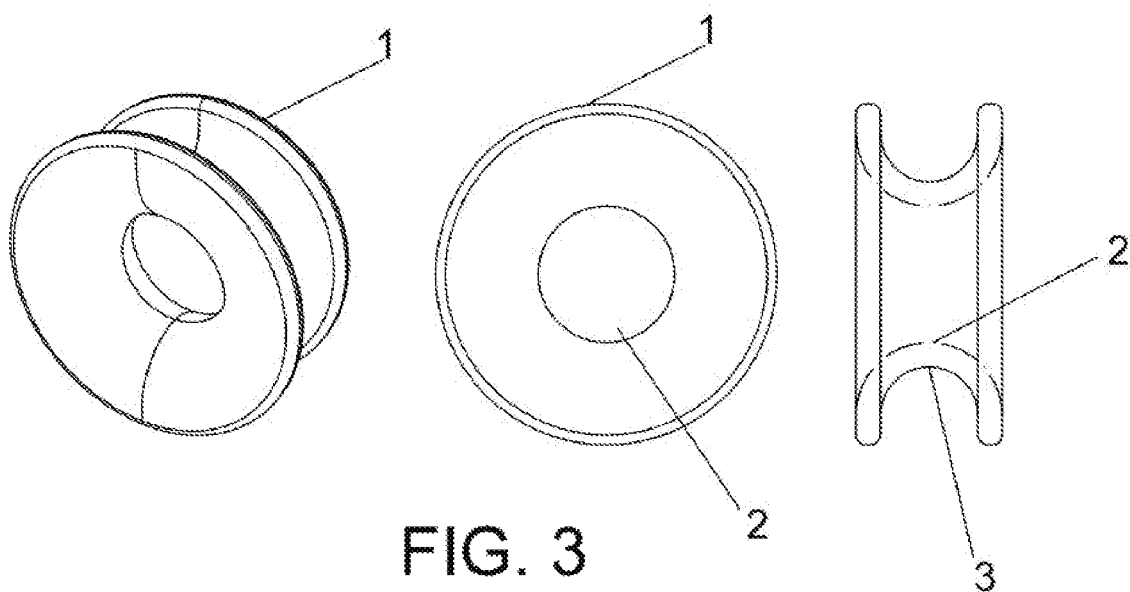
FIG. 3. Shows a view of the wheel or sheave (1) as part of the pulley presented here.
Figure 4:
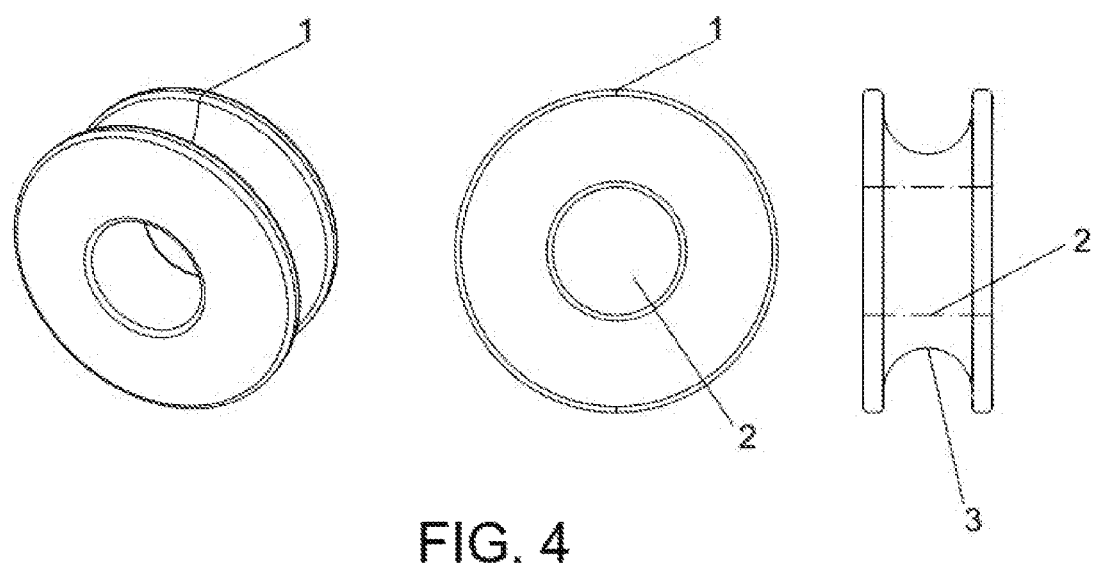
FIG. 4. Shows a view of a second practical embodiment of the wheel or sheave (1).

A preferred embodiment of the invention is shown in the attached figures. More specifically, the pulley object of the present specification is characterized in that it comprises a wheel or sheave (1) that incorporates a central recess (2) and a channel (3) to divert at least one fastening cable (4); and wherein it may optionally contain a body (5), and at least one low-friction bushing (6).

The fastening cable (4) is configured as an element that provides the transfer of effort from the wheel (1) to a fastening point, passing transversely to the sheave (1) through the central recess (2).

The low-friction bushing (6) is housed between the fastening cable (4) and the wheel or sheave (1). The function of said bushing (6) is to decrease the friction force between the fastening cable (4) and the sheave (1) by creating a substrate that prevents direct contact between the cable (4) and the sheave (1), which provides low friction.

In load situation, the bushing (6) is in a compression state between the cable (4) and the sheave (1).

In a practical embodiment, the bushing (6) is in direct contact on one side with the cable (4), and on the other with the sheave (1) through the central recess (2).

In a preferred embodiment, the bushing (6) will be made of a material with low coefficient of friction, also acting as a sacrificed piece as it is not a vital piece in the structural integrity of the pulley, which in turn allows the sheave (1) to rotate.

The body (5) will not possess any primary structural characteristics, its objective being to guide and protect the other components of the pulley.

The fastening cable (4) does not have specific characteristics for its correct operation, which gives it greater versatility, since it is possible to use any type of cable, depending on the load that needs to be applied to the system.

The body (5) and the sheave (1) may be made of various materials, such as metal, plastics, polymers, wood or any material with equivalent mechanical characteristics.

Figure 5:
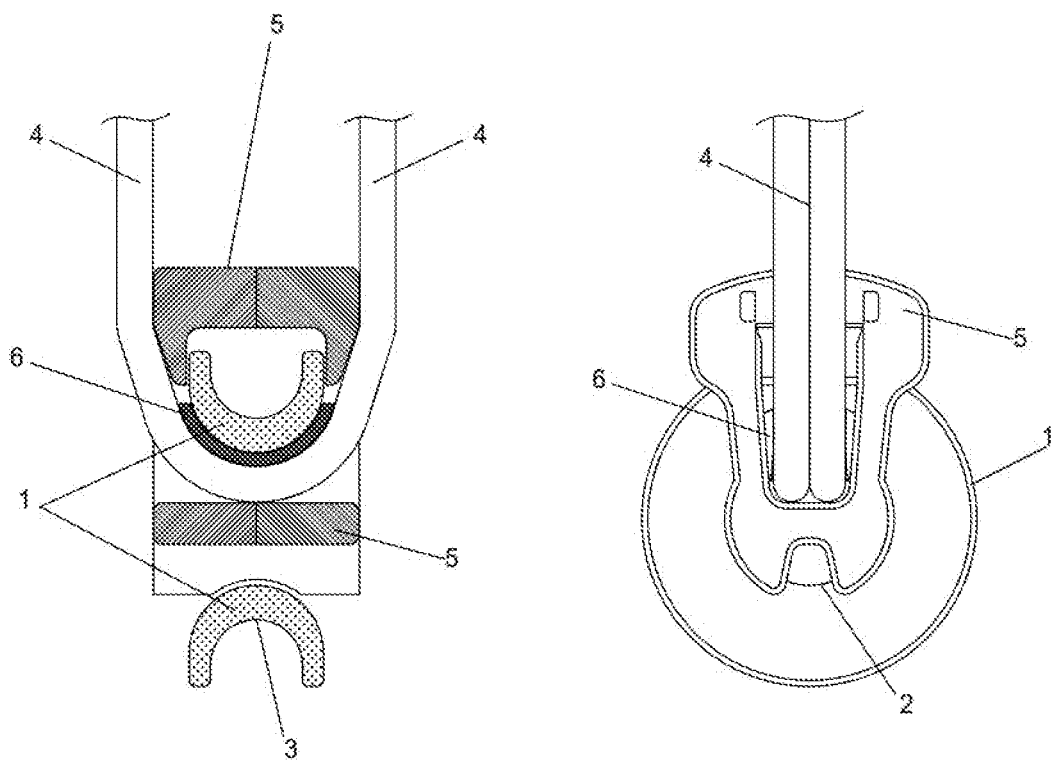
FIG. 5. Shows a section of the pulley presented here, and more specifically, a pulley with body (5).
Figure 6:
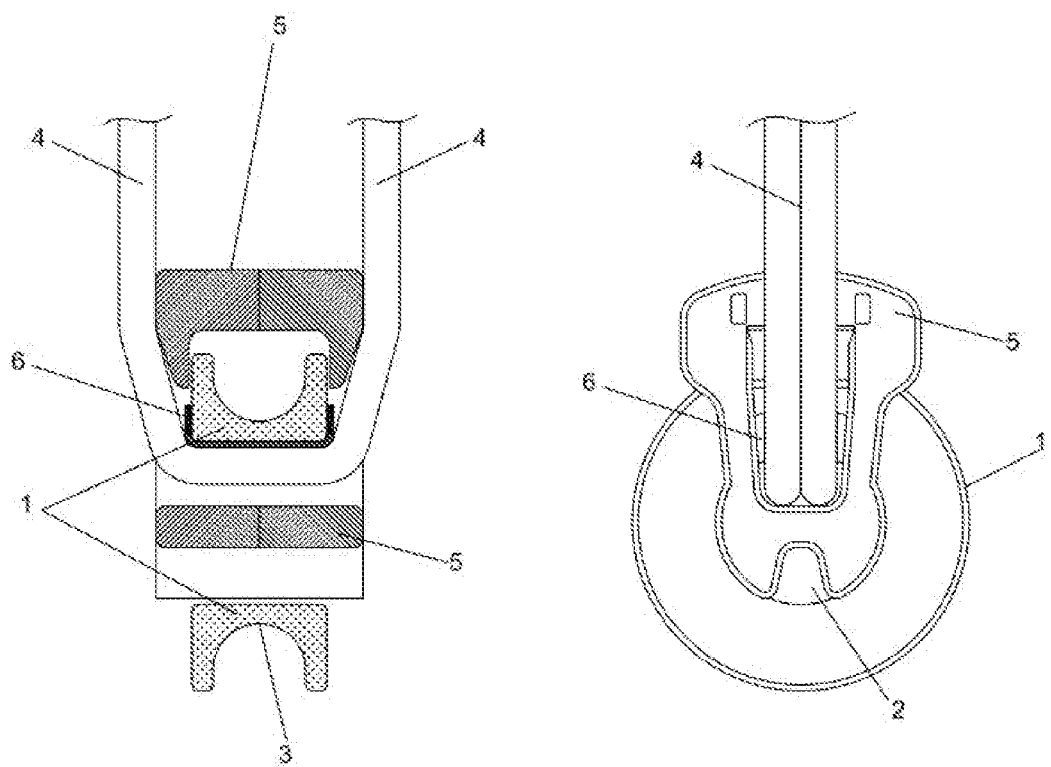
FIG. 6. Shows a particular embodiment of the pulley shown in the previous figure, but with another version of sheave (1).

FIGS. 5 and 6 show detailed views of a second practical embodiment of the pulley, with two versions of sheave (1). These figures show how the fastening cable (4) passes transversely both to the body (5) and to the central recess (2) of the sheave (1), and where the bushing (6) is contained between the fastening cable (4) and the sheave (1), thus using the body (5) as a guide for said cable (4), while protecting the components of the pulley.

Figure 7:
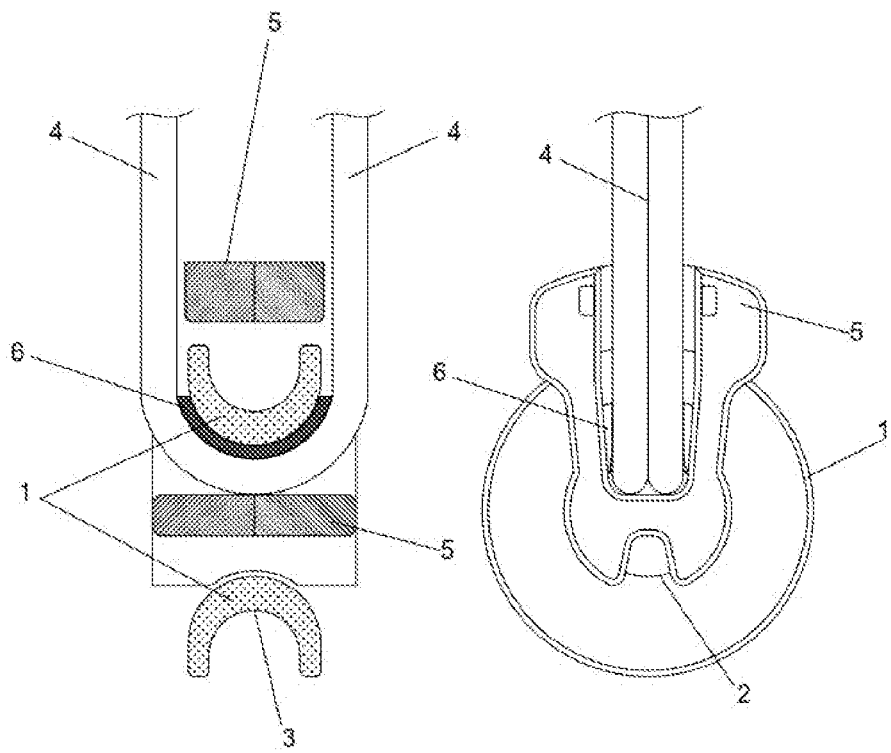
FIG. 7. Shows a third practical embodiment of the pulley.
Figure 8:
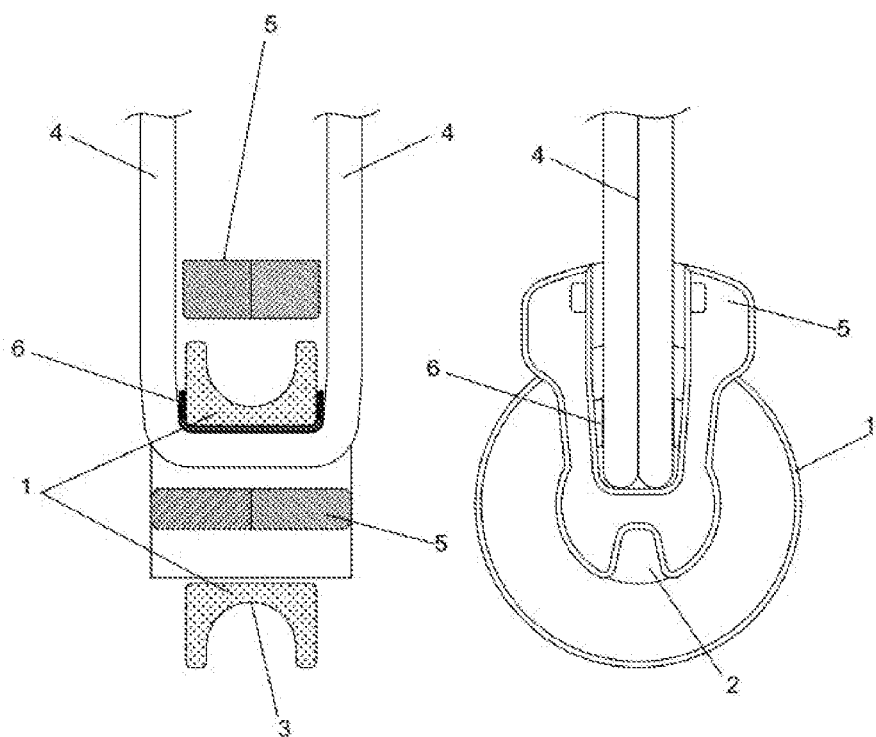
FIG. 8. Shows an embodiment of the pulley shown in the previous figure, but with another version of sheave (1).

FIGS. 7 and 8 show how the body (5) acts as a guide for the cable (4) in a steeper way than in the previous case, which would allow to implement the body in a slightly smaller size, giving more protection to the cable (4).

Figure 9:
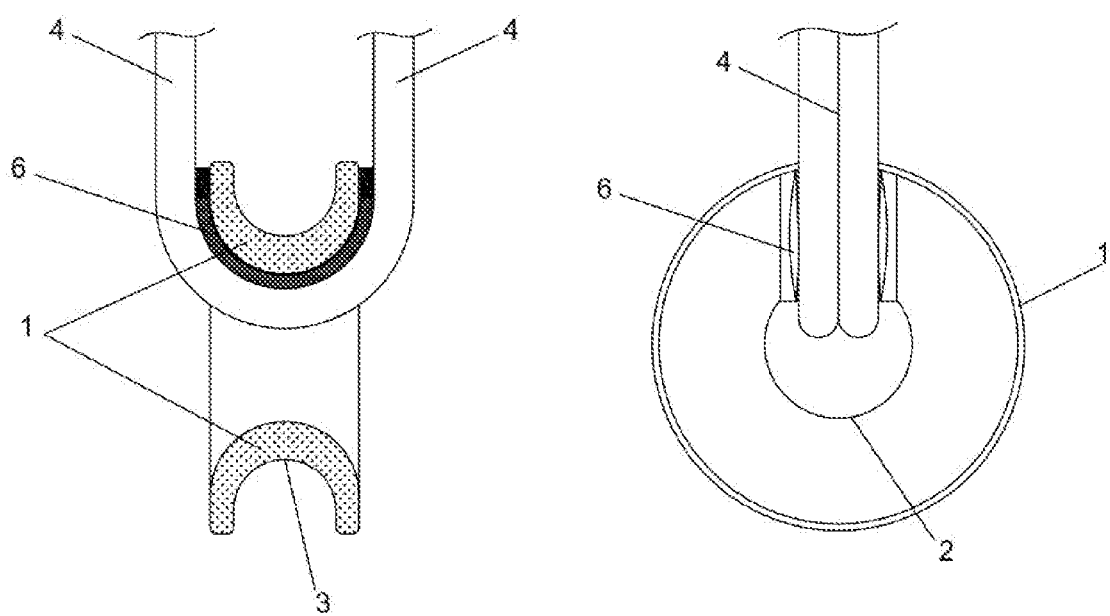
FIG. 9. Shows a fourth practical embodiment of the pulley, without body.
Figure 10:
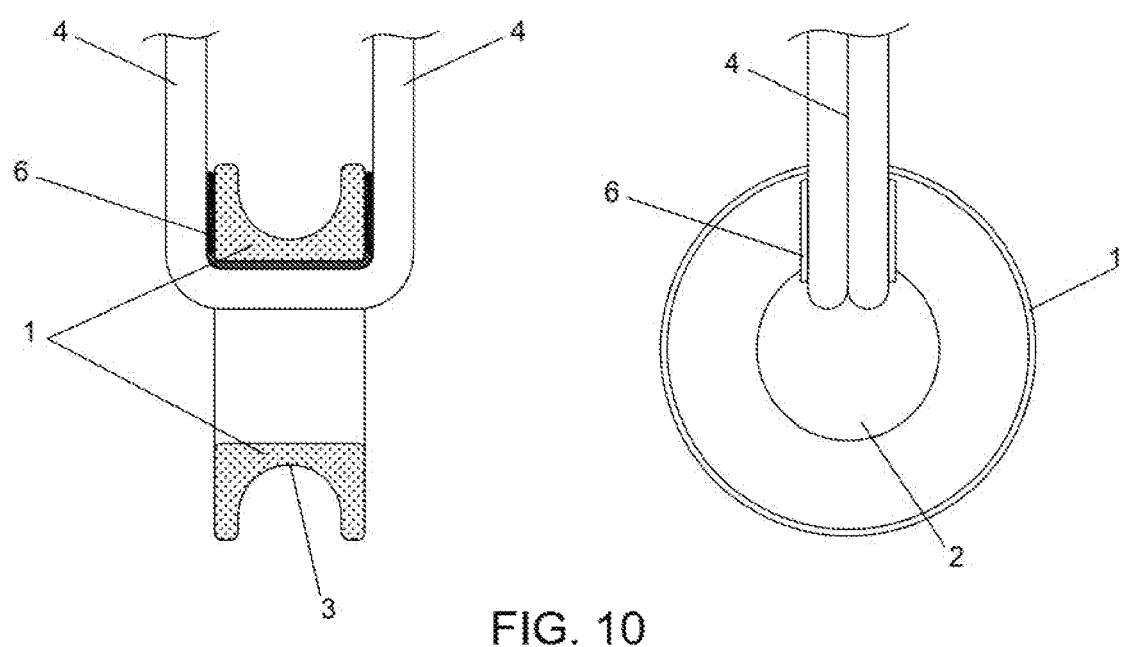
FIG. 10. Shows an embodiment of the pulley shown in the previous figure, but with another version of sheave (1).

FIGS. 9 and 10 show an embodiment of the pulley, without the body (5), which allows to simplify its structure without sacrificing its stability and durability characteristics.

Figure 11:
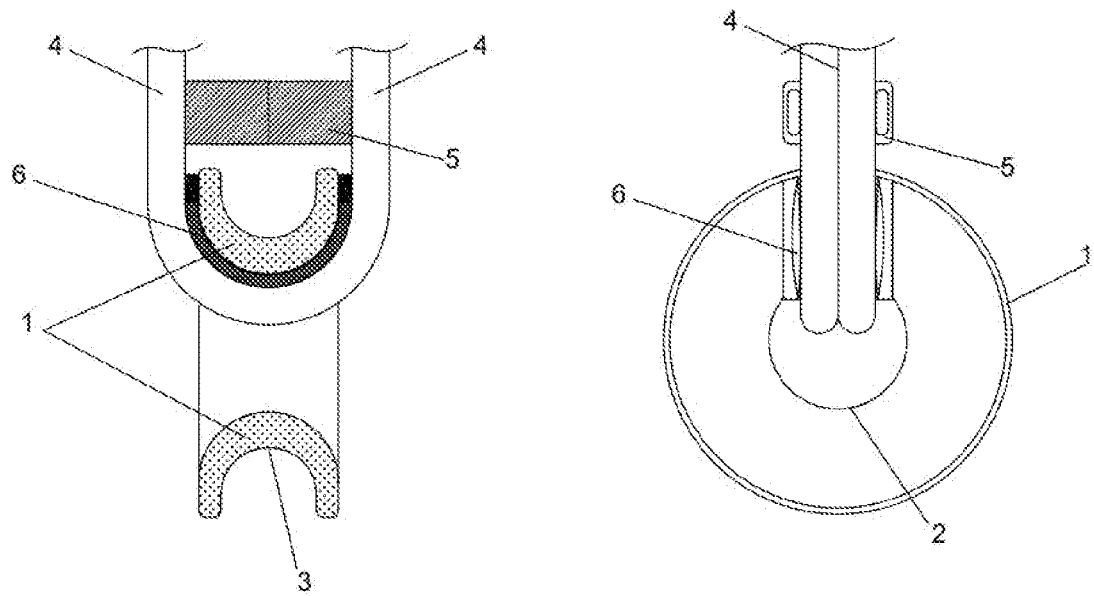
FIG. 11. Shows a fifth practical embodiment of the pulley.
Figure 12:
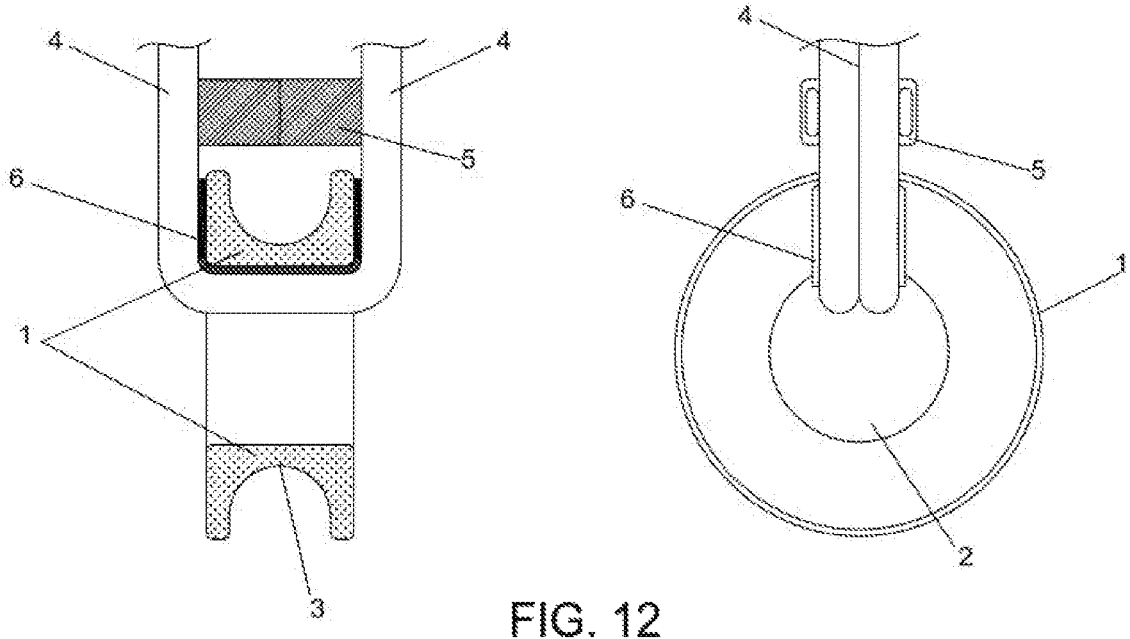
FIG. 12. Shows an embodiment of the pulley shown in the previous figure, but with another version of sheave (1).

FIGS. 11 and 12 show an embodiment of the pulley with a body (5) smaller than in previous cases, so that the sole purpose of the body (5) is to guide the cable (4).

Figure 13:
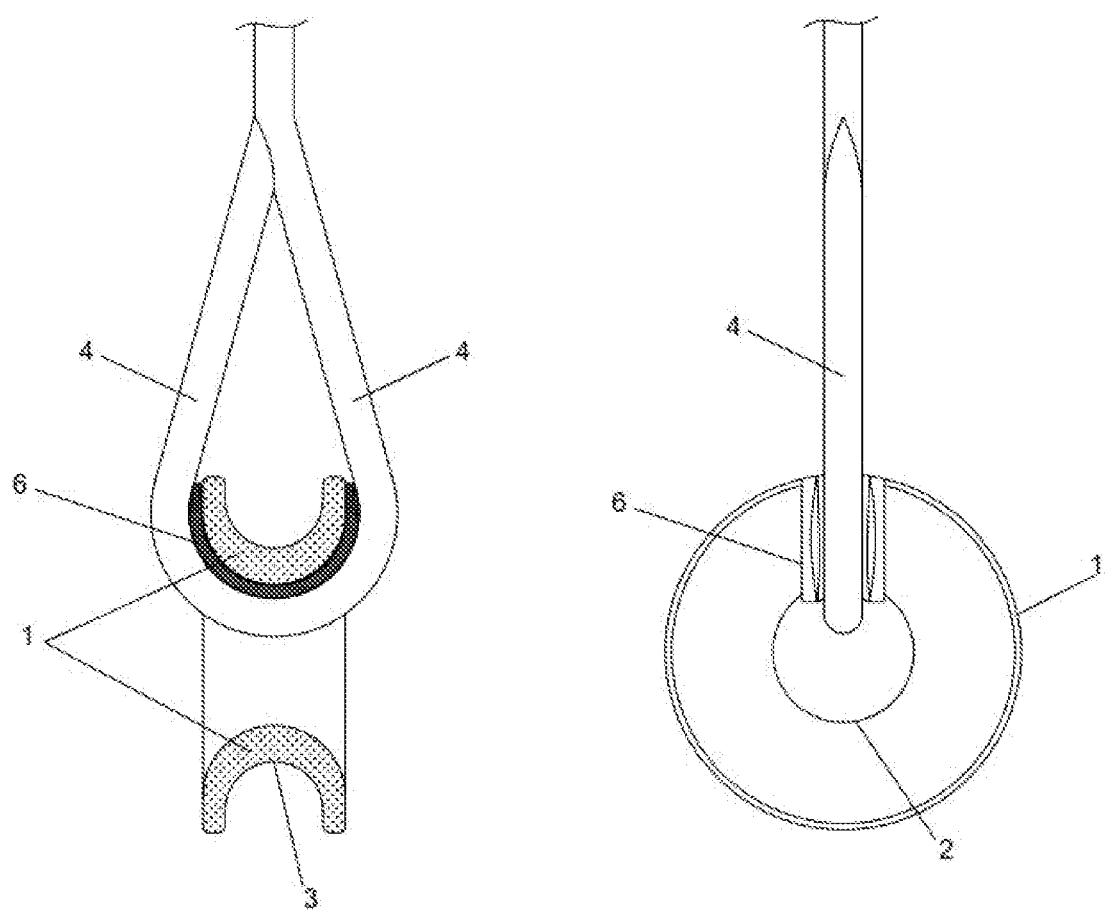
FIG. 13. Shows a sixth practical embodiment of the pulley, with a spliced fastening cable (4).
Figure 14:
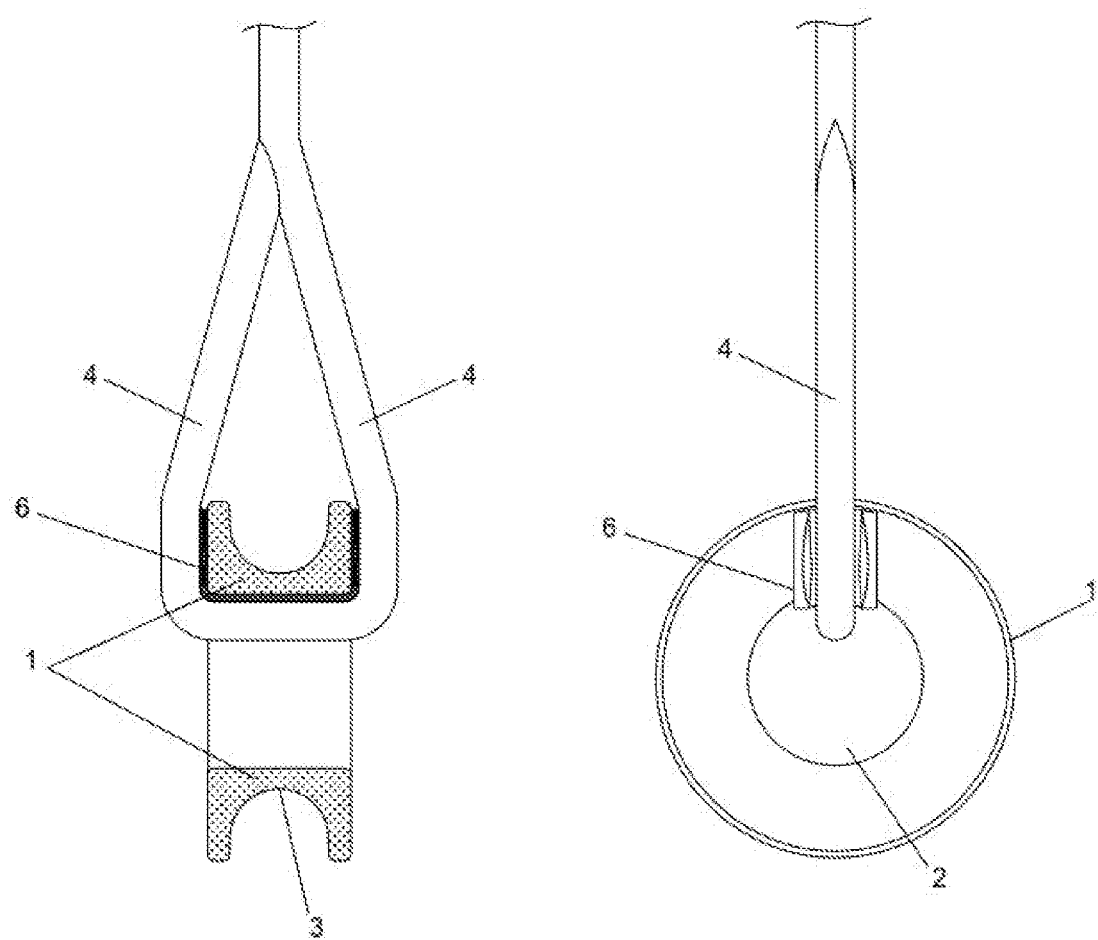
FIG. 14. Shows an embodiment of the pulley shown in the previous figure, but with another version of the sheave (1).

FIGS. 13 and 14 show an embodiment where the fastening cable (4) is formed by several spliced cables, and where the point where they are spliced will provide the unity of the components.

Figure 15:
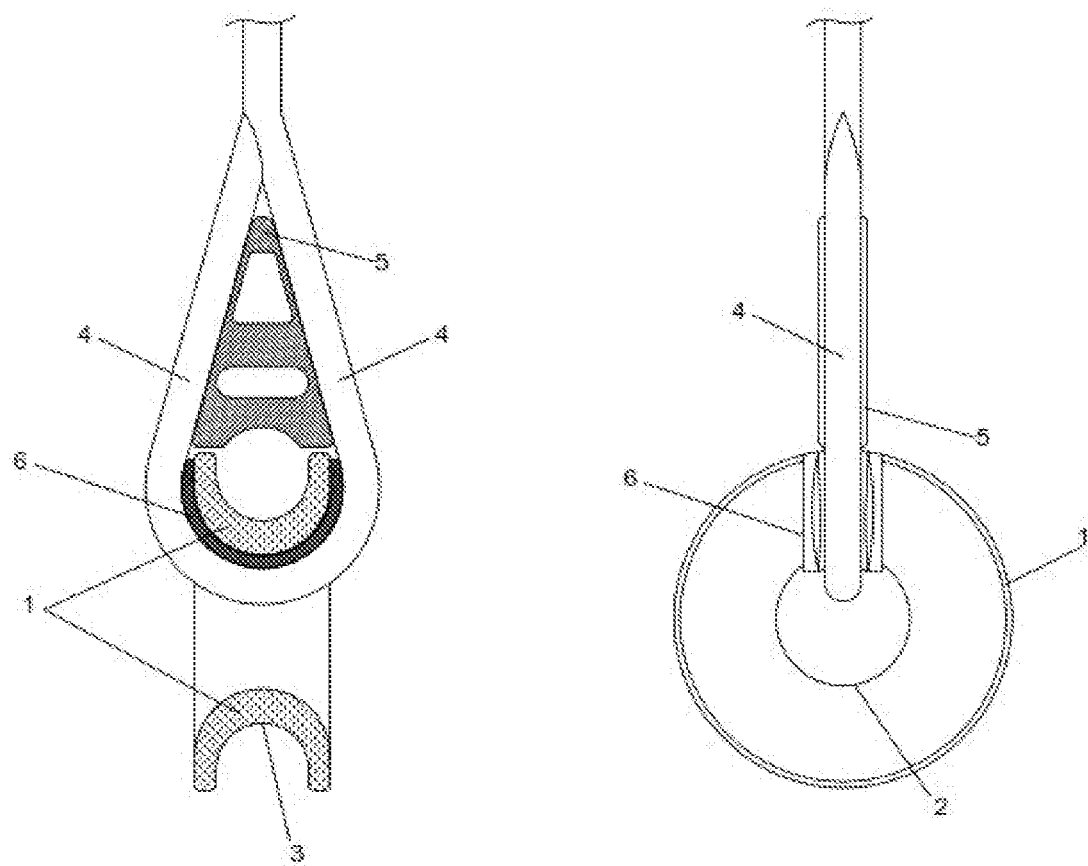
FIG. 15. Shows a seventh practical embodiment of the pulley, with a spliced cable (4) and a body (5).
Figure 16:
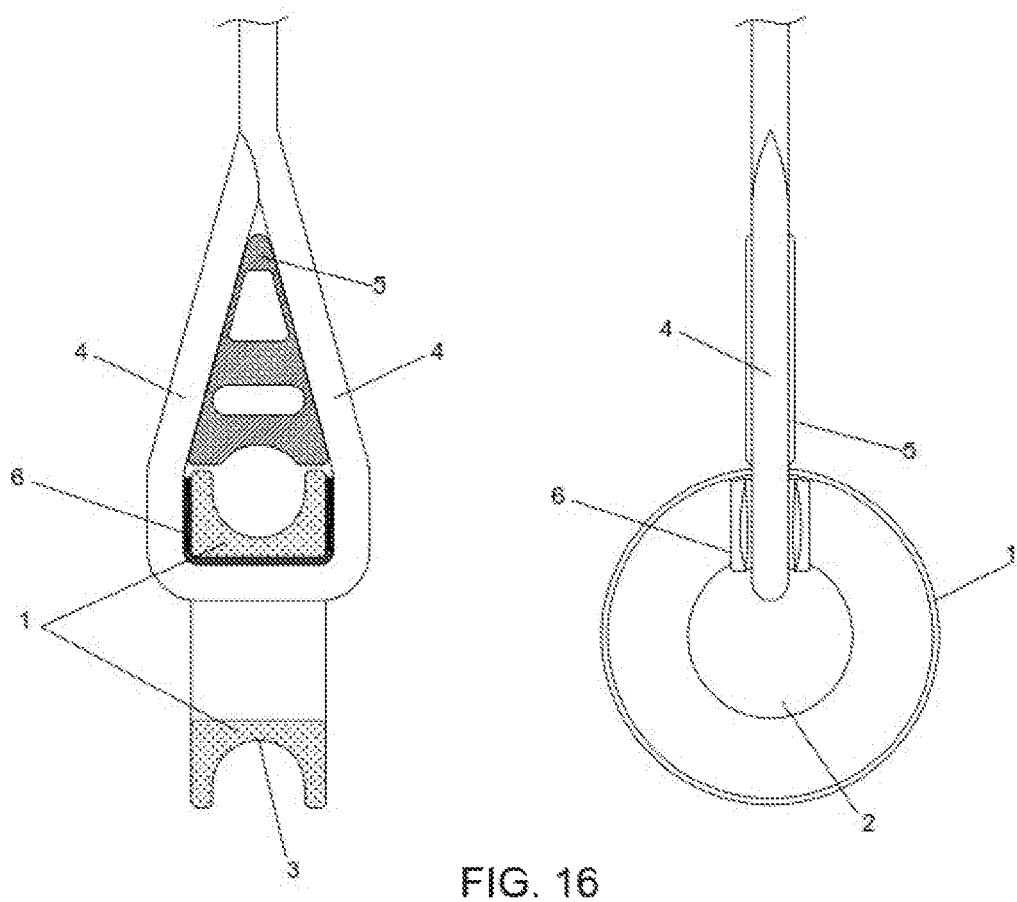
FIG. 16. Shows an embodiment of the pulley shown in the previous figure, but with another version of the sheave (1).

FIGS. 15 and 16 show another embodiment for spliced cables which does incorporate a body (5) that guides the spliced cable (4).

Figure 17:
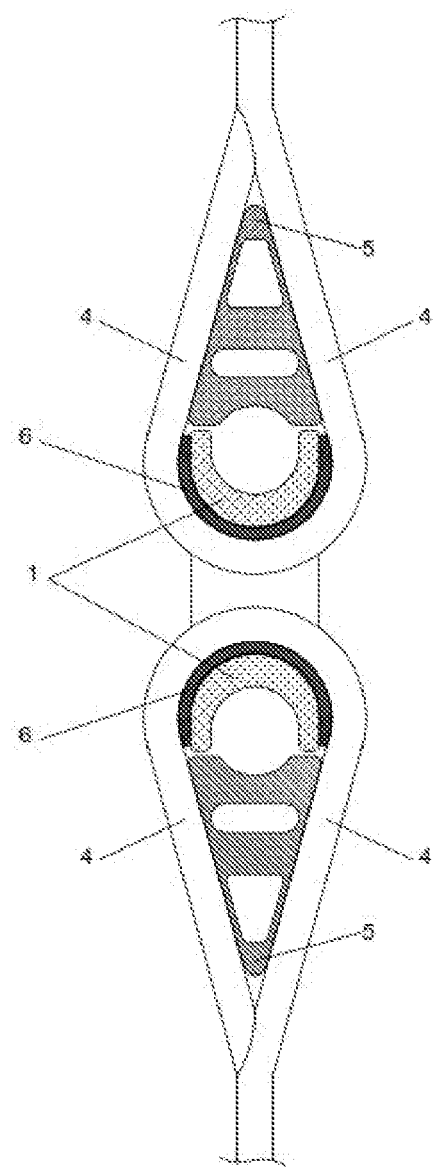
FIG. 17. Shows an eighth practical embodiment of the pulley, which incorporates two bushings (6) and a body (5).
Figure 18:
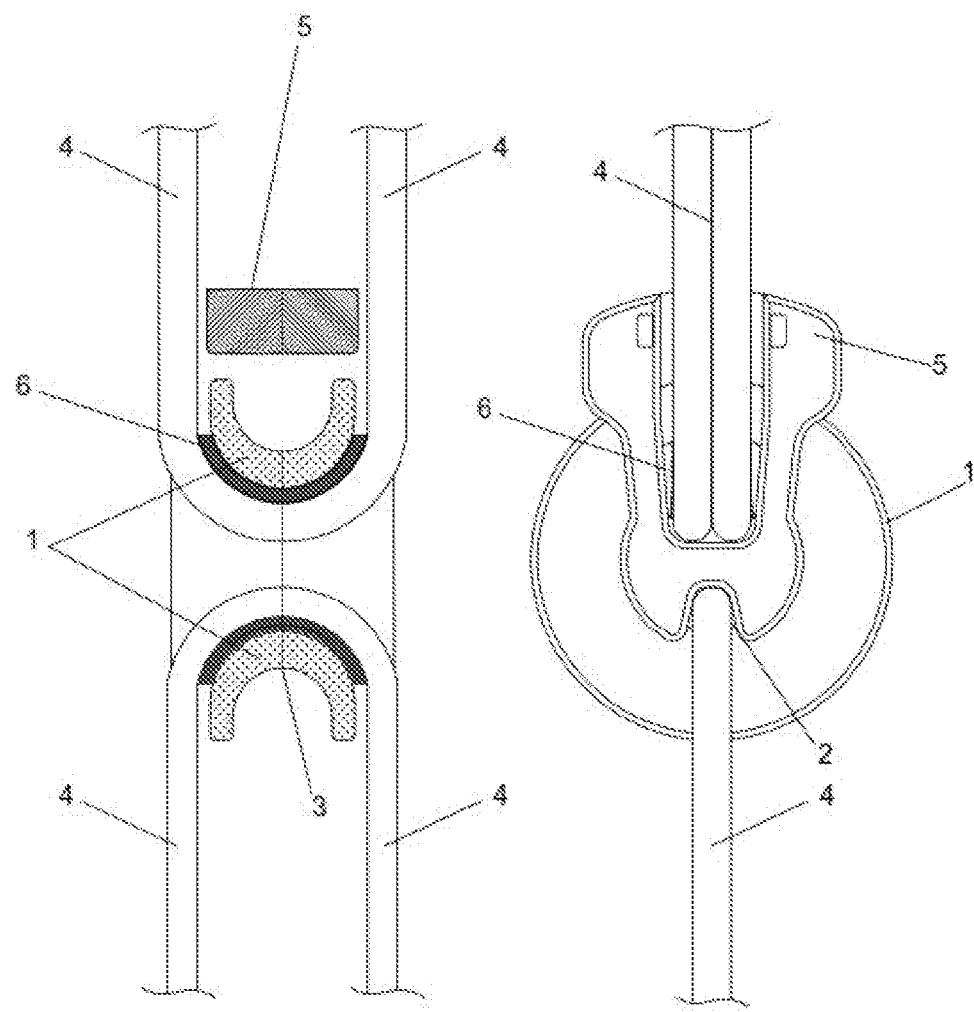
FIG. 18. Shows a view of the first practical embodiment, with the addition of a second bushing (6) to support a second fastening cable (4).

FIGS. 17 and 18 show an embodiment of the pulley which incorporates several bushings (6), and where, more specifically, FIG. 17 shows a version with several bushings (6) and spliced fastening cables (4), while FIG. 18 shows a version in which the second bushing (6) allows adding another fastening cable (4) to the pulley.

Figure 19:
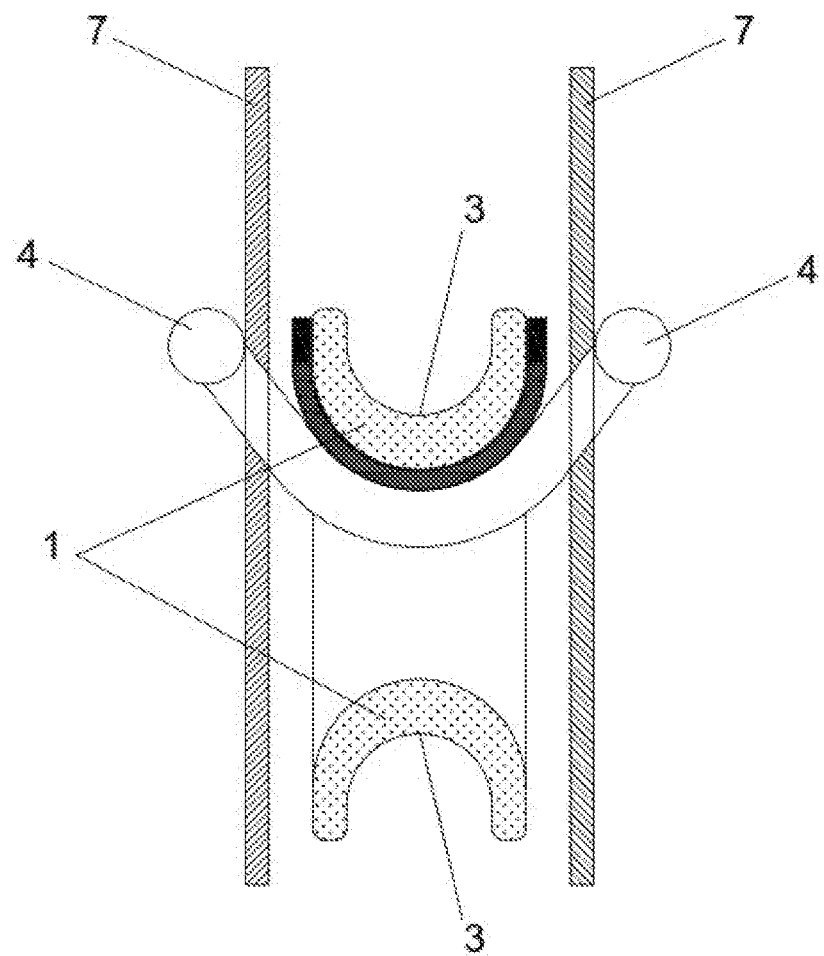
FIG. 19. Shows a ninth practical embodiment of the pulley, specially designed to be used in cases of embedding.
Figure 20:
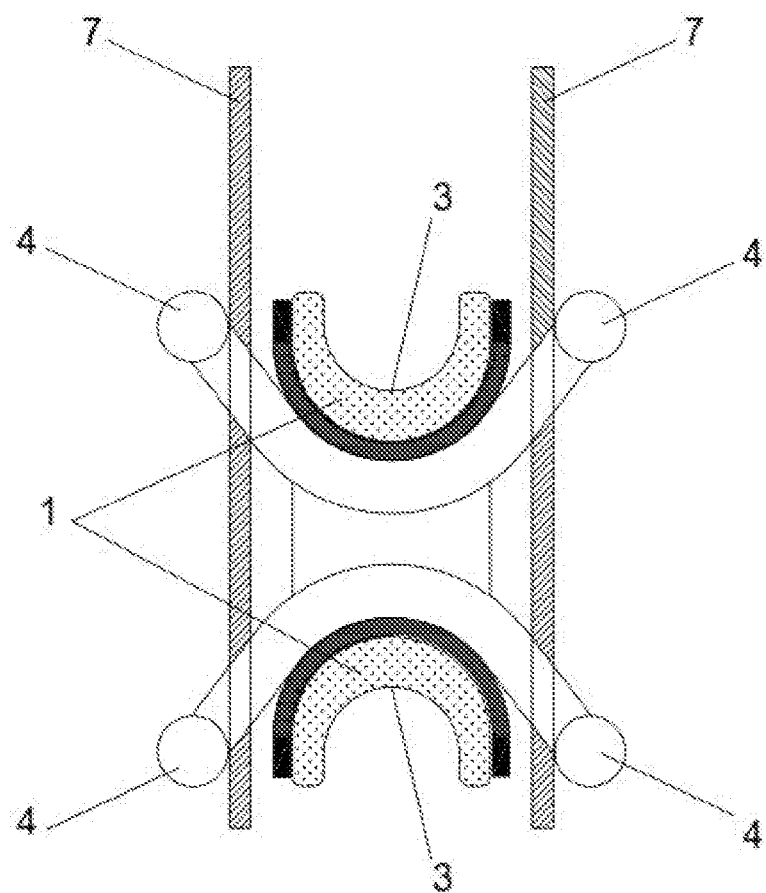
FIG. 20. Shows a view of the pulley of the previous figure, but with two bushings (6) and separate fastening cables (4).

Finally, FIGS. 19 and 20 show an embodiment of the pulley where the pulley is fixed to other components.

More specifically, FIG. 19 shows how said fastening is made by means of the fastening cable (4), being embedded or being fixed in a structure (7) designed for transmitting the generated stresses.

While FIG. 20 shows a version of the previous solution, but with the inclusion of a second bushing (6) that allows its use in cases where the pulley requires greater fastening or less freedom of movement, without interfering with the rotation of the sheave (1).

The invention claimed is:

1. A pulley comprising a sheave (1) without roller bearings that incorporates a central recess (2) and a channel (3); at least one fastening cable (4) configured to transmit the force from the sheave (1) to a fastening point passing transversely to the sheave (1) through the central recess (2); and at least one body having an aperture arranged to guide the fastening cable (4) through the central recess (2);

wherein said pulley further comprises at least one low-friction bushing (6) which is housed between the fastening cable (4) and the sheave (1); and wherein the low-friction bushing (6) comprises two opposite sides, wherein a first side is in direct contact with the fastening cable (4) and a second opposite side is in direct contact with the sheave (1) through the central recess (2) in such a way that the low-friction bushing (6) is in a compression state between the fastening cable (4) and the sheave (1) when loaded.

2. The pulley according to claim 1, including at least one body (5) is made of metal, plastic, polymers, wood, resins, or any material with equivalent mechanical characteristics.

3. The pulley according to claim 1, wherein the fastening cable (4) is formed by one or more spliced cables.

4. The pulley according to claim 1, wherein the fastening cable (4) is embedded or fixed in a structure (7) designed for transmitting the generated stresses.

5. The pulley according to claim 1, wherein the low-friction bushing (6) is made of a material with low coefficient of friction that allows the sheave (1) to rotate.

6. The pulley according to claim 1, wherein the sheave (1) is made of metal, plastic, polymers, wood, resins or any material with equivalent mechanical characteristics.

* * * * *